(12) United States Patent
Lim

(10) Patent No.: US 7,872,391 B2
(45) Date of Patent: Jan. 18, 2011

(54) STATOR CORE

(75) Inventor: Min Kyu Lim, Jinhae-si (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 11/767,550

(22) Filed: Jun. 25, 2007

(65) Prior Publication Data

US 2007/0296300 A1    Dec. 27, 2007

(30) Foreign Application Priority Data

Jun. 26, 2006  (KR)  .................. 10-2006-0057556

(51) Int. Cl.
*H02K 1/14* (2006.01)
*H02K 15/02* (2006.01)
*H02K 1/18* (2006.01)

(52) U.S. Cl. .......... 310/216.043; 29/596; 310/216.009; 310/216.102; 310/216.041

(58) Field of Classification Search .................. 310/259, 310/216.041, 216.043, 216.009, 216.102
See application file for complete search history.

(56) References Cited

U.S. PATENT DOCUMENTS

| | | | |
|---|---|---|---|
| 3,270,231 A * | 8/1966 | Wiley | 310/259 |
| 4,395,815 A * | 8/1983 | Stanley et al. | 29/598 |
| 5,142,179 A | 8/1992 | Nakamura et al. | 310/217 |
| 6,429,568 B1 * | 8/2002 | Shen et al. | 310/254 |
| 7,129,614 B2 * | 10/2006 | Hahn et al. | 310/216 |
| 2005/0067912 A1 * | 3/2005 | Murakami et al. | 310/216 |
| 2005/0073211 A1 * | 4/2005 | Lee | 310/216 |
| 2005/0127775 A1 * | 6/2005 | Lee et al. | 310/216 |

FOREIGN PATENT DOCUMENTS

| | | | |
|---|---|---|---|
| JP | 05-252253 | * | 3/1995 |
| JP | 10-225027 | * | 8/1998 |

\* cited by examiner

*Primary Examiner*—Burton Mullins
(74) *Attorney, Agent, or Firm*—KED & Associates, LLP

(57) ABSTRACT

A stator core is disclosed. The stator core is constructed in a structure in which stress and spring back of the stator core are minimized when a stator is manufactured in a spiral fashion, whereby workability is improved. The stator core includes a yoke formed in the shape of a band, a plurality of teeth protruding outward from one side of the yoke, the teeth being arranged at predetermined intervals in the longitudinal direction of the yoke, a plurality of notches formed at the inside of the yoke in the shape of a cutout such that the notches are arranged at equal intervals, and guide holes formed in the longitudinal direction of the yoke. The guide holes include holes formed at positions corresponding to the respective teeth and holes formed between the respective teeth.

13 Claims, 5 Drawing Sheets

STATOR CORE

CROSS-REFERENCE TO RELATED APPLICATION

This application claims the benefit of Korean Patent Application No. 10-2006-0057556, filed on Jun. 26, 2006, which is hereby incorporated by reference in its entirety as if fully set forth herein.

BACKGROUND OF THE INVENTION

1. Field of the Invention

The present invention relates to a stator, and more particularly, to a stator core constructed in a structure in which stress and spring back of the stator core are minimized when a stator is manufactured in a spiral fashion, whereby workability is improved.

2. Discussion of the Related Art

Based on the drive mode thereof, a motor may be classified as an indirect connection type motor which indirectly transmits a drive force to an object to be rotated using a pulley and belt or a direct connection type motor, such as a brushless direct current (BLDC) motor, in which a rotor of the motor is directly connected to an object to be rotated such that a drive force from the motor is directly transmitted to the object.

In the indirect connection type motor, the drive force of which is not directly transmitted to the object but indirectly transmitted to the object via a belt wound on a pulley of the motor or the object, however, energy loss occurs, and a large noise is generated, during the transmission of the drive force.

For this reason, there has been increasingly used the direct connection type motor, i.e., the BLDC motor, which solves the problems caused from the indirect connection type motor.

The BLDC motor includes a rotor directly connected to an object to be rotated for transmitting a drive force to the object and a stator for generating a magnetic force, when electric current is supplied to the stator, to rotate the rotor using an attractive force and a repulsive force between the stator and the rotor.

The stator may be manufactured by stacking a plurality of blanked cores or by stacking a core in a spiral fashion.

For the stator manufactured by stacking the blanked cores, a large amount of core scrap is generated during blanking the cores, whereby material costs are increased. For the stator manufactured by stacking the core in the spiral fashion, on the other hand, a base material is stacked in the spiral fashion, whereby the generation of core scrap is minimized, and therefore, the increase of material costs is minimized.

Hereinafter, a conventional stator manufactured by stacking a core in a spiral fashion will be described with reference to FIGS. 1 and 2.

FIG. 1 is a perspective view illustrating a conventional stator core stacked in a spiral fashion, and FIG. 2 is a plan view of the conventional stator core after the stacking of the stator core is completed.

As shown in FIGS. 1 and 2, the stator core includes a yoke 1 having guide holes 1a, into which guide pins of a winding apparatus (not shown) are inserted, and a plurality of teeth 3 protruding from the outside of the yoke 1 such that a coil is wound on the teeth 3.

When winding the stator core, large stress is generated at the inside of the yoke 1. In order to reduce the stress, as shown in FIGS. 1 and 2, notches 5 are formed at the inside of the yoke 1.

However, the stator core with the above-stated construction has the following problems.

First, as shown in FIGS. 1 and 2, the guide holes 1a, formed in the stator core, are arranged in a one-to-one correspondence to the teeth 3.

In other words, the guide holes 1a are not formed between the respective teeth 3. As a result, when the stator core is wound while the guide pins of the winding apparatus are sequentially inserted into the guide holes 1a of the stator core, it is not possible to maximize a support force of the stator core that is supported by the guide pins of the winding apparatus.

Consequently, the stator core does not minimize spring back generated due to the restoring force of the stator core.

Secondly, the number of the notches 5 formed between the respective teeth 3 is one, and therefore, it is not possible to minimize stress generated at the inside of the yoke 1 when winding the stator core.

SUMMARY OF THE INVENTION

Accordingly, the present invention is directed to a stator core that substantially obviates one or more problems due to limitations and disadvantages of the related art.

An object of the present invention is to provide a stator core constructed in a structure in which spring back and stress of the stator core, generated when winding the stator core to manufacture a stator in a spiral fashion, are minimized.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stator core includes a yoke formed in the shape of a band, a plurality of teeth protruding outward from one side of the yoke, the teeth being arranged at predetermined intervals in the longitudinal direction of the yoke, a plurality of notches formed at the inside of the yoke in the shape of a cutout such that the notches are arranged at equal intervals, and guide holes formed in the longitudinal direction of the yoke, the guide holes including holes formed at positions corresponding to the respective teeth and holes formed between the respective teeth.

Preferably, the guide holes are arranged in a line in the longitudinal direction of the yoke.

Preferably, the notches are disposed between the respective guide holes.

Preferably, the guide holes are arranged in a zigzag fashion in the longitudinal direction of the yoke.

Preferably, the guide holes are disposed at the lower ends of the teeth and between the respective notches.

Preferably, the notches are disposed at positions corresponding to the respective teeth.

Preferably, the notches are formed in the shape of a trapezoidal cutout.

Preferably, the stator core further includes semicircular notches formed at the corners of the cutout regions of the respective notches.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First, a stator core according to a first embodiment of the present invention will be described in detail with reference to FIG. 3.

Figure 1:
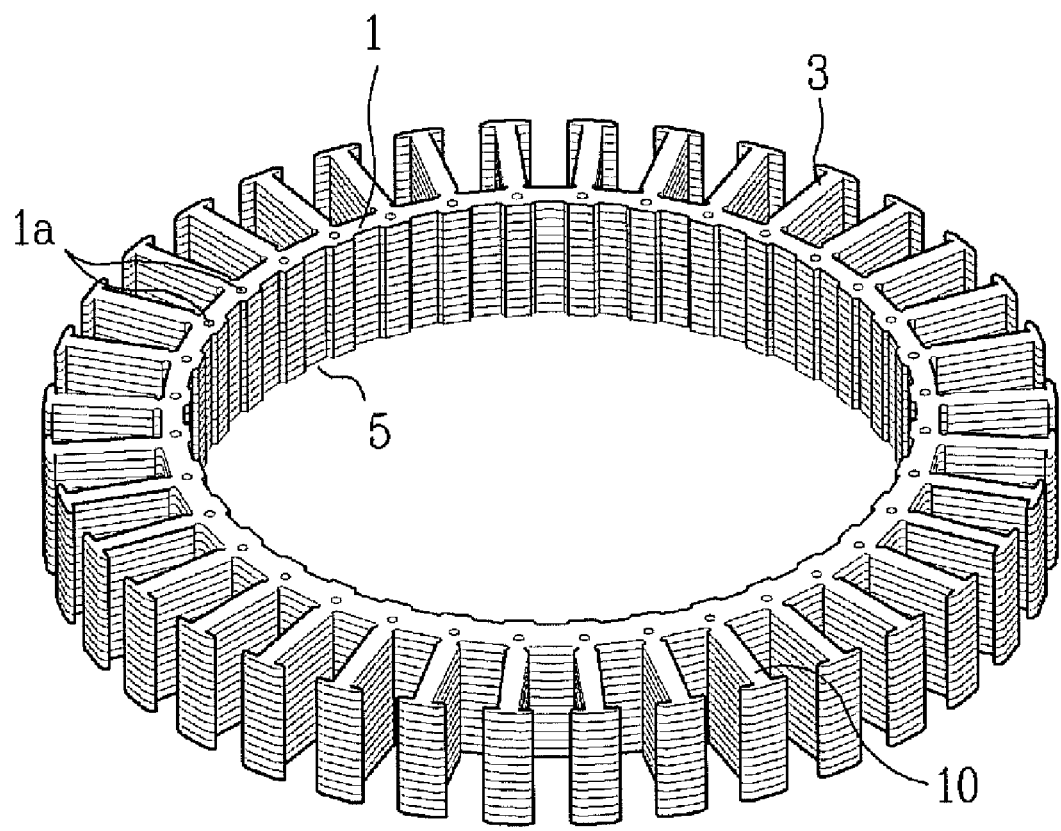
FIG. 1 is a perspective view illustrating a conventional stator core stacked in a spiral fashion.
Figure 2:
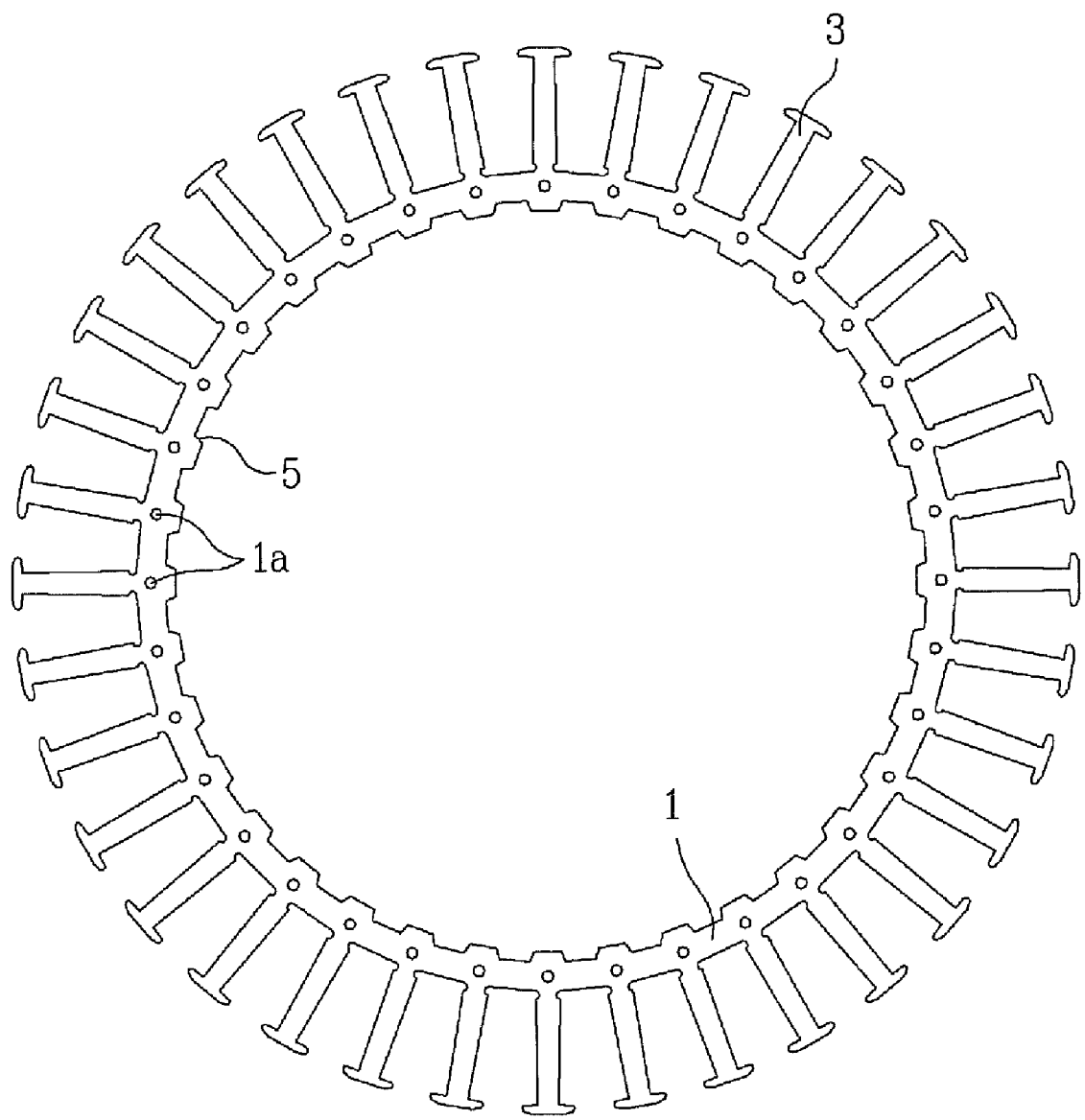
FIG. 2 is a plan view of the conventional stator core after the stacking of the stator core is completed.
Figure 3:
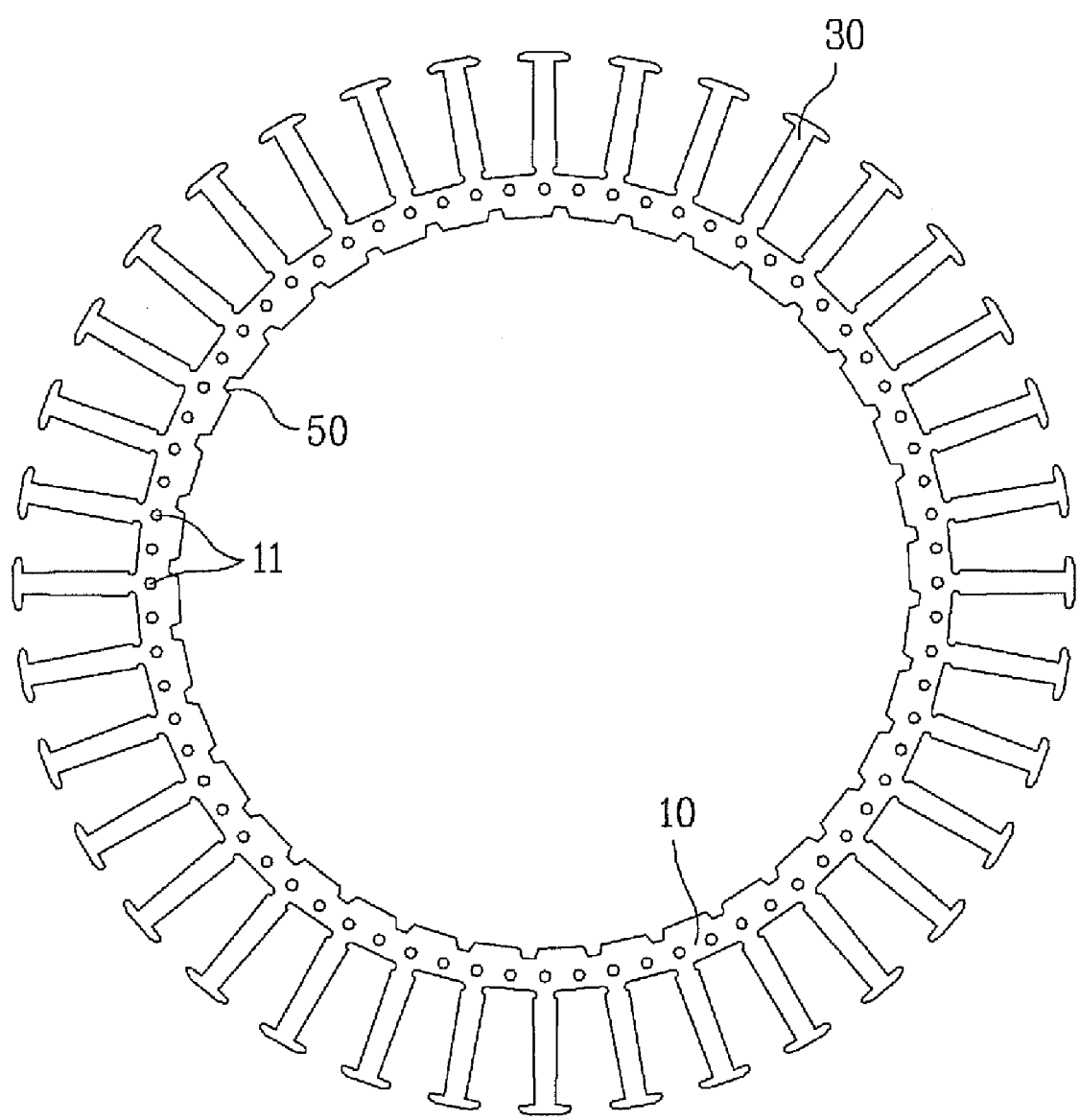
FIG. 3 is a plan view illustrating a stator core according to a first embodiment of the present invention wound in a spiral fashion.

FIG. 3 is a plan view illustrating a stator core according to a first embodiment of the present invention wound in a spiral fashion.

The stator core includes a yoke 10, teeth 30, and notches 50.

The yoke 10 is formed in the shape of a band having a large length to width ratio.

Also, the yoke 10 is provided with a plurality of guide holes 11, into which guide pins of a winding apparatus (not shown), which winds the stator core in a spiral fashion to stack the stator core, will be inserted.

The teeth 30 protrude outward from one side of the yoke 10 such that a coil (not shown) for generating electric current in the stator is wound on the teeth 30. The teeth 30 are arranged at equal intervals in the circumferential direction of the yoke 10.

At this time, the teeth 30 are arranged such that the teeth 30 correspond to the alternate guide holes 11. Consequently, not only the guide holes 11 are arranged in a one-to-one correspondence to the teeth 30, but also the guide holes 11 are disposed between the respective teeth 30.

As described above, the distance between the respective guide holes is small, with the result that the distance between the respective guide pins, of the winding apparatus, corresponding to the guide holes is also small. Consequently, it is possible to minimize spring back generated at the stator core when winding the stator core.

If the number of the guide holes 11 is greater than that of this embodiment, the strength of the yoke 10 may be reduced.

The notches 50 serve to minimize stress generated at the yoke 10 when winding the stator core. Specifically, the notches 50 are formed at the inside of the yoke 10, i.e., the side of the yoke 10 opposite to the teeth 30, in the shape of a cutout.

At this time, the notches 50 are arranged at predetermined equal intervals along the inside edge of the yoke 10. Preferably, the notches 50 are disposed between the respective guide holes 11.

This is because greater stress is generated at the yoke 10 between the guide holes 11 of the stator core, into which the guide pins of the winding apparatus are inserted, when winding the stator core.

Consequently, the notches 50 are formed at the yoke 10 where large stress is generated to minimize stress generated at the yoke 10, whereby the stator core is smoothly stacked.

Preferably, the notches 50 are formed in the shape of a polygonal cutout to maximize the dispersion of the stress generated at the yoke 10.

Hereinafter, a process for stacking the stator core according to the first embodiment of the present invention will be described.

The stator core, manufactured, for example, by press, has a predetermined size. The stator core is supplied to a winding apparatus (not shown), having a plurality of guide pins arranged on the circumference thereof, while the teeth 30 of the stator core face outward.

The guide pins of the winding apparatus are sequentially inserted into the guide holes 11 formed in the yoke 10 in the direction in which the stator core is supplied. As a result, the linear yoke 10 is bent in the shape of an arc about the notches 50, by the action of the guide pins of the winding apparatus, and therefore, the yoke 10 is plastically deformed.

As the winding apparatus is rotated once, the stator core is changed into the shape of a circle.

When the yoke 10 is plastically deformed, spring back may occur, i.e., the yoke 10 may be restored to its original state due to the restoring force of the yoke 10.

However, the guide holes 11 are further formed at the predetermined positions between the respective teeth 30 in addition to the predetermined positions corresponding to the teeth 30. Consequently, the support force of the guide pins is further secured. As a result, it is possible to minimize the spring back of the stator core when winding the stator core.

As the winding apparatus is continuously rotated, the stator core is sequentially stacked upward from the lowermost layer. After the process for stacking the stator core is completed, the stacked stator core is pressurized in the thickness of the stator core such that the layers of the stator core are brought into tight contact with each other.

In the stator core according to the first embodiment of the present invention, the guide holes, formed in the yoke, are arranged in a line in the circumferential direction of the yoke, as can be clearly understood from the above description.

A stator core according to a second embodiment of the present invention is characterized in that the guide holes, formed in the yoke, are arranged in a zigzag fashion in the circumferential direction of the yoke.

The stator core according to the second embodiment of the present invention will be described hereinafter in detail with reference to FIG. 4.

Figure 4:
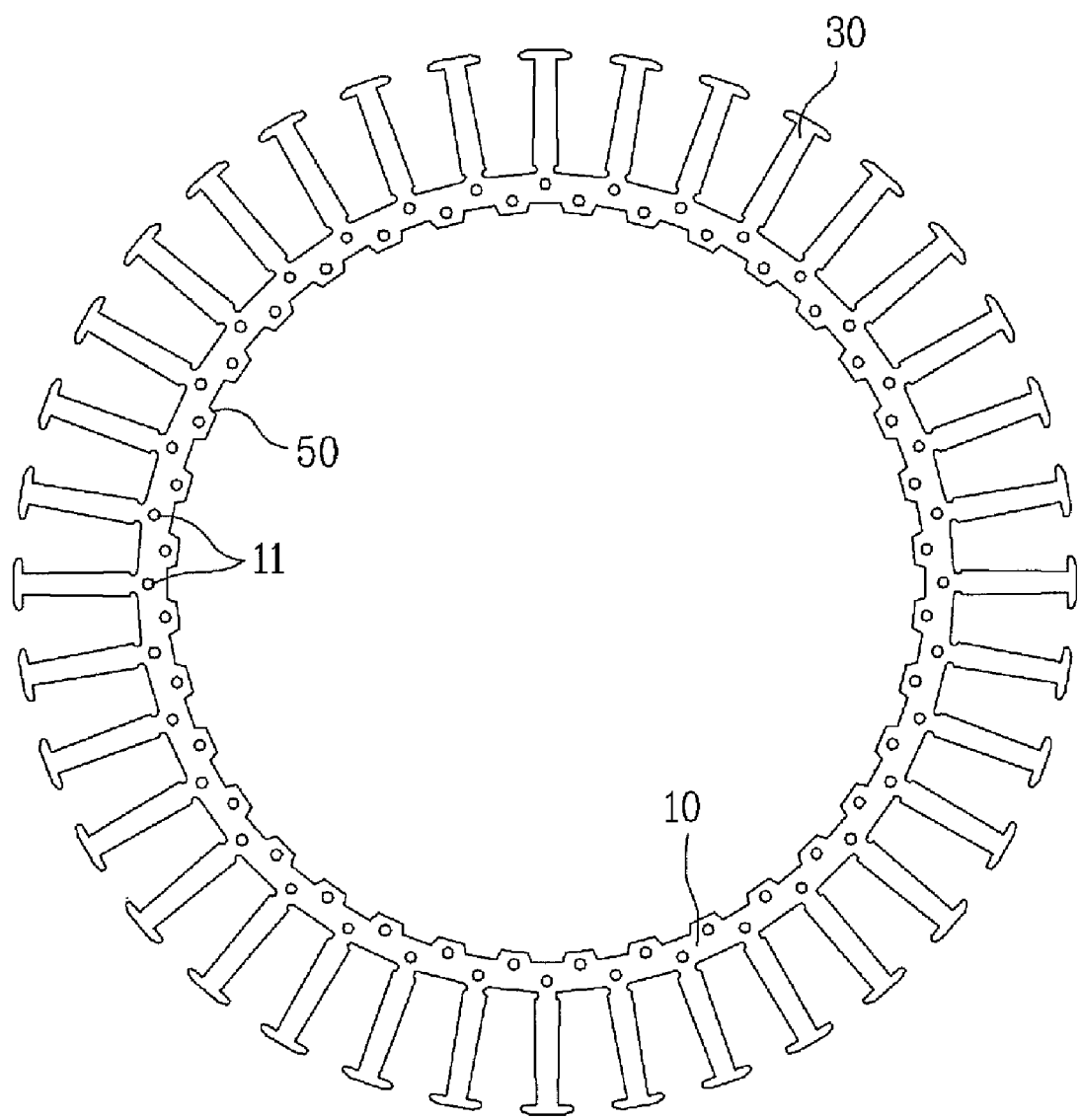
FIG. 4 is a plan view illustrating a stator core according to a second embodiment of the present invention wound in a spiral fashion.

FIG. 4 is a plan view illustrating a stator core according to a second embodiment of the present invention wound in a spiral fashion. Components of the stator core according to the second embodiment, which are identical to those of the stator core according to the first embodiment, are denoted by the same reference numerals.

Referring to FIG. 4, the stator core includes a yoke 10, teeth 30, and notches 50.

The yoke 10 is formed in the shape of a band having a large length to width ratio.

Also, the yoke 10 is provided with a plurality of guide holes 11, into which guide pins of a winding apparatus (not shown), which winds the stator core in a spiral fashion to stack the stator core, will be inserted.

The guide holes 11 are formed in the outside (on the drawing) and the inside (on the drawing) of the yoke 10 in a zigzag fashion in the circumferential direction of the yoke 10. At this time, the guide holes 11 formed in the outside of the yoke 10 are arranged in a one-to-one correspondence to the teeth 30, whereas the guide holes 11 formed in the inside of the yoke 10 are disposed between the respective teeth 30.

The teeth 30 protrude outward from one side of the yoke 10 such that a coil for generating electric current in the stator is wound on the teeth 30. The teeth 30 are arranged at equal intervals in the circumferential direction of the yoke 10.

At this time, as described above, the teeth 30 correspond to the guide holes 11 formed in the outside of the yoke 10.

The notches 50 serve to minimize stress generated at the yoke 10 when the stator core is plastically deformed. Specifically, the notches 50 are formed along the inside of the yoke 10, i.e., the side of the yoke 10 opposite to the teeth 30, in the shape of a cutout.

At this time, the notches 50 are arranged at predetermined equal intervals along the inside edge of the yoke 10. Preferably, the notches 50 are disposed, at the positions corresponding to the teeth 30, between the respective guide holes 11 formed in the inside of the yoke.

Specifically, the guide holes 11 are formed at the positions corresponding to the teeth 30 in the outside of the yoke 10 in the circumferential direction of the yoke 10, the notches 50 are formed at the positions corresponding to the teeth 30 at the inside of the yoke 10, and the guide holes 11 are formed between the respective notches 50.

It can be easily understood that the guide holes 11 formed in the inside of the yoke 10 are naturally disposed between the respective teeth 30 according to the above-described construction of the stator core.

In the stator core according to the second embodiment of the present invention, the guide pins of the winding apparatus are inserted into the guide holes 11 of the yoke 10 in a zigzag fashion to wind the stator core as shown in FIG. 4. Consequently, stress generated at the inside of the yoke is minimized by the notches 50, and spring back generated at the yoke 10 is minimized by the guide holes formed in the inside and the outside of the yoke 10.

A process for stacking the stator core according to the second embodiment is identical to that of the previous first embodiment, and therefore, a description thereof will not be given in order to avoid the repetition of the description.

Hereinafter, a stator core according to a third embodiment of the present invention will be described in detail with reference to FIG. 5.

Figure 5:
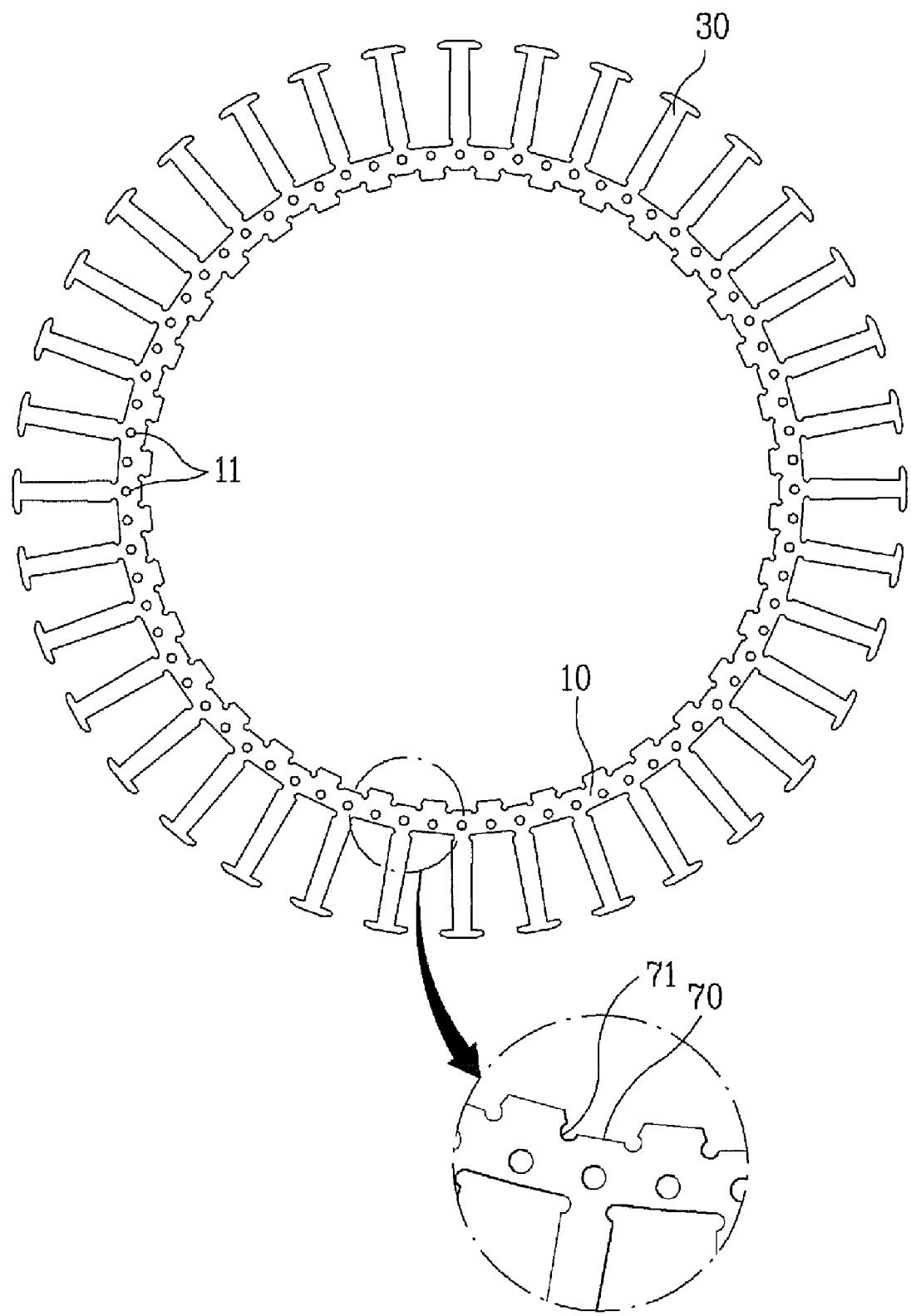
FIG. 5 is a plan view illustrating a stator core according to a third embodiment of the present invention wound in a spiral fashion.

FIG. 5 is a plan view illustrating a stator core according to a third embodiment of the present invention wound in a spiral fashion. Components of the stator core according to the third embodiment, which are identical to those of the stator core according to the first embodiment, are denoted by the same reference numerals.

Referring to FIG. 5, the stator core includes a yoke 10, teeth 30, and notches 70.

The yoke 10 is formed in the shape of a band having a large length to width ratio.

Also, the yoke 10 is provided with a plurality of guide holes 11, into which guide pins of a winding apparatus (not shown), which winds the stator core in a spiral fashion to stack the stator core, will be inserted.

At this time, the guide holes 11 are arranged in a line in the circumferential direction of the yoke 10.

The teeth 30 protrude outward from one side of the yoke 10 such that a coil for generating electric current in the stator is wound on the teeth 30. The teeth 30 are arranged at equal intervals in the circumferential direction of the yoke 10.

At this time, the teeth 30 are arranged such that the teeth 30 correspond to the alternate guide holes 11. Consequently, not only the guide holes 11 are arranged in a one-to-one correspondence to the teeth 30, but also the guide holes 11 are disposed between the respective teeth 30.

As described above, the distance between the respective guide holes is small, with the result that the distance between the respective guide pins, of the winding apparatus, corresponding to the guide holes is also small. Consequently, it is possible to minimize spring back generated at the stator core when winding the stator core.

If the number of the guide holes 11 is greater than that of this embodiment, the strength of the yoke 10 may be reduced. Consequently, the above-described arrangement of the guide holes 11 is preferred.

The notches 70 serve to minimize stress generated at the yoke 10 when the stator core is plastically deformed. Specifically, the notches 70 are formed at the inside of the yoke 10, i.e., the side of the yoke 10 opposite to the teeth 30, in the shape of a cutout.

At this time, the notches 70 are arranged at predetermined equal intervals along the inside edge of the yoke 10. Also, the notches 70 are disposed at the positions corresponding to the teeth 30. Specifically, the guide holes 11 are arranged in a line at the outside of the yoke 10 in the circumferential direction of the yoke 10, and the notches 70 are disposed at the positions corresponding to the teeth at the inside of the hole.

Preferably, the notches 70 are formed in the shape of a trapezoidal cutout.

More preferably, semicircular sub notches 71 are additionally formed in the corners of the trapezoidal cutout regions of the respective notches 70.

This is to minimize stress generated at the side of the yoke 10 opposite to the teeth 30 when winding the stator core.

That is, the sub notches 71 are additionally formed at the respective notches 70, whereby stress generated at the yoke is dispersed, and therefore, the stress is further reduced.

Consequently, the stress is minimized by the notches 70 when winding the stator core. Also, the guide pins are inserted into the guide holes 11 formed at the positions corresponding to the teeth 30 and between the respective teeth 30, whereby the spring back of the stator core is minimized.

A process for stacking the stator core according to the third embodiment is identical to that of the previous first embodiment, and therefore, a description thereof will not be given in order to avoid the repetition of the description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

According to the stator core of the present invention, the guide holes are formed at the positions corresponding to the respective teeth and between the respective teeth such that the guide holes are arranged in a line or in a zigzag fashion in the longitudinal direction of the yoke. Consequently, the spring back of the stator core, generated when winding the stator core, is minimized.

Furthermore, other notches are additionally formed at the respective notches formed at the yoke. Consequently, it is possible to minimize stress generated at the yoke when winding the stator core.

As a result, the process for manufacturing the stator is smoothly carried out, and therefore, workability is improved.

What is claimed is:

1. A stator core comprising:
    a yoke formed in a shape of a band;
    a plurality of teeth protruding outward from one side of the yoke, the teeth being arranged at predetermined intervals in a longitudinal direction of the yoke;
    a plurality of notches formed at an inside of the yoke in a shape of a polygonal cutout such that the notches are arranged at equal intervals;
    guide holes formed in the longitudinal direction of the yoke, the guide holes including holes formed at positions corresponding to the respective teeth and holes formed between the respective teeth; and
    semicircular sub-notches having a center point provided in the corners of the respective notches.

2. The stator core according to claim 1, wherein the guide holes are arranged in a line in the longitudinal direction of the yoke.

3. The stator core according to claim 2, wherein the notches are disposed between the respective guide holes.

4. The stator core according to claim 1, wherein the guide holes are arranged in a zigzag fashion in the longitudinal direction of the yoke.

5. The stator core according to claim 4, wherein the guide holes are disposed at lower ends of the teeth and between the respective notches.

6. The stator core according to claim 1, wherein the notches are disposed at positions corresponding to the respective teeth.

7. The stator core according to claim 6, wherein the notches are formed in the shape of a trapezoidal cutout.

8. The stator core according to claim 1, wherein a number of the guide holes is twice a number of the teeth.

9. A stator core comprising:
    a yoke formed in a shape of a band, the yoke having a plurality of guide holes formed at equal intervals;
    a plurality of teeth protruding outward from one side of the yoke, the teeth being arranged at predetermined intervals in a longitudinal direction of the yoke;
    a plurality of notches formed at an inside of the yoke in a shape of a polygonal cutout such that the notches are arranged at equal intervals, the notches being disposed at positions corresponding to the respective teeth; and
    semicircular sub-notches having a center point provided in the corners of the respective notches.

10. The stator core according to claim 9, wherein the guide holes are arranged in a zigzag fashion in the longitudinal direction of the yoke.

11. The stator core according to claim 9, wherein the guide holes are disposed at lower ends of the teeth and between the respective notches.

12. The stator core according to claim 9, wherein the notches are formed in the shape of a trapezoidal cutout.

13. A stator core comprising:
    a yoke formed in a shape of a band, the yoke having a plurality of guide holes formed at equal intervals;
    a plurality of teeth protruding outward from one side of the yoke, the teeth being arranged at predetermined intervals in a longitudinal direction of the yoke;
    a plurality of notches formed at an inside of the yoke in a shape of a polygonal cutout such that the notches are arranged at equal intervals, wherein the polygonal cutout has three sides including a first side, a second side and a third side located between the first side and the second side; and
    sub-notches having a center point provided in the corners of the polygonal cutout regions of the respective notches, wherein the sub-notches include:
        a first sub-notch formed in a semicircular shape of a cutout between the first side and the third side, and
        a second sub-notch formed in a semicircular shape of a cutout between the second side and the third side.

* * * * *